United States Patent
Sagardoyburu et al.

(10) Patent No.: US 8,558,853 B2
(45) Date of Patent: Oct. 15, 2013

(54) SINGLE VIEW DISPLAY

(75) Inventors: Michel Sagardoyburu, Angais (FR);
Allan Evans, Oxford (GB); Alistair Paul Curd, High Wycombe (GB);
Sumanta Talukdar, Chippenham (GB);
Harry Garth Walton, Oxford (GB);
Nathan James Smith, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 870 days.

(21) Appl. No.: 12/388,639

(22) Filed: Feb. 19, 2009

(65) Prior Publication Data

US 2009/0213147 A1 Aug. 27, 2009

(30) Foreign Application Priority Data

Feb. 21, 2008 (GB) .................................. 0803168.4

(51) Int. Cl.
*G09G 5/10* (2006.01)

(52) U.S. Cl.
USPC ........................................................ 345/690

(58) Field of Classification Search
USPC ............................ 345/7, 690; 349/62; 385/10
See application file for complete search history.

(56) References Cited

U.S. PATENT DOCUMENTS

| | | | |
|---|---|---|---|
| 4,542,449 A | 9/1985 | Whitehead | |
| 5,132,839 A | 7/1992 | Travis | |
| 5,175,030 A | 12/1992 | Lu et al. | |
| 5,319,491 A | 6/1994 | Selbrede | |
| 5,526,146 A | 6/1996 | Goodman et al. | |
| 5,771,066 A * | 6/1998 | Barnea | 348/59 |
| 5,825,436 A | 10/1998 | Knight | |
| 5,831,698 A | 11/1998 | Depp et al. | |
| 5,862,275 A | 1/1999 | Takeuchi et al. | |
| 5,877,829 A | 3/1999 | Okamoto et al. | |
| 6,028,978 A | 2/2000 | Takeuchi et al. | |
| 6,061,108 A | 5/2000 | Anderson et al. | |
| 6,091,182 A | 7/2000 | Takeuchi et al. | |
| 6,211,853 B1 | 4/2001 | Takeuchi et al. | |
| 6,211,930 B1 | 4/2001 | Sautter et al. | |
| 6,297,578 B1 | 10/2001 | Takeuchi et al. | |
| 6,339,464 B1 | 1/2002 | Anderson et al. | |

(Continued)

FOREIGN PATENT DOCUMENTS

| | | |
|---|---|---|
| GB | 2343760 | 5/2000 |
| JP | 05-108023 A | 4/1993 |

(Continued)

OTHER PUBLICATIONS

Chih Nan Wu and Wei-Chung Cheng, "Viewing Direction-Aware Backlight Scaling", Great Lakes Symposium 2007, VLSI, p. 281-286.

(Continued)

*Primary Examiner* — Quan-Zhen Wang
*Assistant Examiner* — Tony Davis
(74) *Attorney, Agent, or Firm* — Renner, Otto, Boisselle & Sklar, LLP

(57) ABSTRACT

A single view display of reduced power consumption is provided. The display comprises a display device for displaying the single view and an optical system for concentrating light modulated by the single view into a reduced angular range. A viewer direction determining system determines the direction of a viewer relative to the display and controls the display device and the optical system so that the angular range includes the direction of the viewer.

22 Claims, 14 Drawing Sheets

(56) References Cited

U.S. PATENT DOCUMENTS

| | | |
|---|---|---|
| 6,369,954 B1 | 4/2002 | Berge et al. |
| 6,570,324 B1 | 5/2003 | Tutt et al. |
| 6,647,166 B2 | 11/2003 | Richardson |
| 6,724,973 B1 | 4/2004 | Takeuchi et al. |
| 6,967,698 B2 | 11/2005 | Tanoue et al. |
| RE39,874 E | 10/2007 | Berge et al. |
| 7,443,596 B1 | 10/2008 | Berge |
| 2001/0005284 A1* | 6/2001 | Lee et al. ............... 359/619 |
| 2005/0002113 A1 | 1/2005 | Berge |
| 2005/0117016 A1 | 6/2005 | Surman |
| 2005/0243265 A1 | 11/2005 | Winlow et al. |
| 2006/0170644 A1 | 8/2006 | Ioki et al. |
| 2007/0103790 A1 | 5/2007 | Berge |
| 2007/0126669 A1 | 6/2007 | Seto et al. |
| 2007/0188667 A1* | 8/2007 | Schwerdtner ............... 349/15 |
| 2007/0222915 A1* | 9/2007 | Niioka et al. ............... 349/62 |
| 2008/0204548 A1* | 8/2008 | Goulanian et al. ............... 348/51 |
| 2008/0316611 A1 | 12/2008 | Berge |
| 2010/0202725 A1* | 8/2010 | Popovich et al. ............... 385/10 |
| 2010/0208163 A1 | 8/2010 | Fuchikami et al. |

FOREIGN PATENT DOCUMENTS

| | | |
|---|---|---|
| JP | 07-056171 A | 3/1995 |
| JP | 11-194723 A | 7/1999 |
| JP | 2004-286978 A | 10/2004 |
| WO | 99/18456 | 4/1999 |
| WO | 2007/004377 | 1/2007 |
| WO | 2007/144843 | 12/2007 |

OTHER PUBLICATIONS

N.R. Smith et al., "Agile wide-angle beam steering with electrowetting microprisms" Jul. 10, 2006, vol. 14, No. 14, p. 6557-6563/ Optics Express.

* cited by examiner

SINGLE VIEW DISPLAY

This nonprovisional application claims priority under 35 U.S.C. §119(a) on Patent Application No. 0803168.4 filed in United Kingdom on 21 Feb. 2008, the entire contents of which are hereby incorporated by reference.

FIELD OF THE INVENTION

The present invention relates to a single view display and to the use of such a display.

In the field of display devices, the power consumption is an important factor. For handheld devices, a limited consumption allows for more autonomy or reduction of the battery capacity. The battery is often a limiting factor in the miniaturisation of consumer electronics. Size and weight of the battery depend on the power consumption and the desired autonomy of the products. Hence, improvement in energy consumption is very desirable for small electronic products, such as mobile phones or laptops.

The power consumption is also an important consideration for bigger electronic devices. Energy has a financial cost and more importantly the production of this power has an effect on our environment. Consumers are now considering the power consumption as an important parameter in the choice of their purchase.

BACKGROUND OF THE INVENTION

Emitting display devices such as liquid crystal displays (LCDs), cathode ray tubes (CRTs), organic light emitting diodes (OLEDs) and plasma display panels (PDPs) are present in a number of electronic devices among which are watches, mobile phones, displays in cars, monitors or TVs for example.

Those display devices are not energy efficient. The emission of light is the most important factor of power consumption in a display. Most of this light, emitted in all directions, is wasted because a very small amount reaches the eyes of a user.

Efforts have been made to control the direction of light on axis with the aim of saving power. The user is generally in front of the display, especially with handheld devices. It is sometimes not necessary to have sideways emission of light. Optical components have been designed to concentrate the light emitted by the light sources in a direction close to the axis of the display. Examples of these power saving components are prismatic structures in backlights for LCDs to collimate the light on axis (U.S. Pat. No. 6,967,698) or prismatic films known as brightness enhancement films (U.S. Pat. No. 4,542,449, U.S. Pat. No. 5,175,030) or arrays of lenses (U.S. Pat. No. 6,570,324 array of lenses on OLED). Those methods provide an increased efficiency on axis at the expense of a low visibility off axis. In those systems, the illumination profile does not change when the user is off axis. The user must be in front of the display if he wants to keep watching the display in optimal conditions. When he is off axis, he sees a low brightness image and the light on axis is wasted.

Directional displays such as 3D displays or privacy displays (US20050243265, U.S. Pat. No. 5,132,839) provide control of the light direction. These displays control this light direction by either redirecting the light beams or by absorbing the light emitted toward the unwanted direction.

3D displays send two different images into two adjacent viewing zones, one for each eye of the user. Some of these displays provide an illumination which is dependent on the user position. They use a tracking system that detects the position of the user. The light transmitted is directed to the two viewing windows providing a different image to each of these windows. The selection is realised by different optical means such as parallax barriers or arrays of microlenses. Some examples are U.S. Pat. No. 5,132,839 (Travis), US application 20050117016 (Surman). The refraction method, such as the lenticular system, provides an efficient way to control the light direction, not wasting light by absorption. However, in those display systems, crosstalk is an important parameter to avoid. Hence, when designing 3D or multi-view displays, the priority is to reduce the crosstalk but the power saving is not an important parameter.

3D displays must show different images to different locations in order to achieve the desired 3D effect. Privacy displays are "single view" displays in that they do not do this. However, privacy displays (US20050243265, U.S. Pat. No. 5,831,698, U.S. Pat. No. 6,211,930 U.S. Pat. No. 5,825,436 and U.S. Pat. No. 5,877,829) provide an image within a narrow viewing angle in order to prevent snooping from anybody out of this viewing zone. The viewing zone can be switched to a wider viewing zone in public mode, allowing for multiple users to watch the screen. The switching is controlled by the user. The downside of this system is that the user has to be in front of the screen. The narrow viewing zone does not follow the main user position.

The downside of these directional displays comes from the requirement of the application. In a 3D display or a dual view display, the viewing zones must not overlap and create what is commonly called cross-talk. With privacy displays, the restricted viewing zone should have a sharp cut-off. Any leakage of light at angles outside the private zone could allow a prohibited person to read the display. As the quality of the light direction in such displays is important, the control of the light direction is done at the expense of power saving.

Some other displays provide a power saving benefit as a function of the user position. (Viewing Direction-Aware Backlight Scaling, Chih-Nan Wu and Wei-Chung Cheng, Great Lakes Symposium 2007 on VLSI, p 281-286) In this paper, the backlight power is turned up when a viewer moves away from the central axis. This compensates for the fact that the display's apparent brightness would otherwise be lower to an off-axis viewer. However these displays still send light in all directions and so they waste most of this light.

SUMMARY OF THE INVENTION

According to a first aspect of the invention, there is provided a single view display comprising a transmissive display device illuminated by a backlight for displaying a single view, an optical system for concentrating light modulated by the single view into a reduced angular range, and a determining system for determining the direction of a viewer relative to the display and for controlling at least one of the display device and the optical system by refracting the angular range of illumination from the backlight so that the angular range includes the determined direction.

The determining system may be arranged to control the at least one of the display device and the optical system so as to vary the angle subtended by the angular range in order to include the determined direction. The angular range may be substantially symmetrical about the display axis. The angle of the angular range may be variable in a first plane containing the display axis. The angle of the angular range may be variable in a second plane containing the display axis and perpendicular to the first plane.

The determining system may be arranged to control the at least one of the display device and the optical system so as to vary the direction of the angular range in order to include the determined direction. The direction of the angular range may be variable in a third plane containing the display axis. The direction of the angular range may be variable in a fourth plane containing the display axis and perpendicular to the third plane.

The determining system may be arranged to determine the directions of a plurality of viewers relative to the display. The determining system may be arranged to control the at least one of the display device and the optical system so that the angular range includes all of the determined directions. The determining system may be arranged to control the at least one of the display device and the optical system to produce a plurality of angular ranges whose directions include all of the determined directions.

The determining system may include a manually operable control to allow the viewer to select the determined direction.

The determining system may comprise an automatic viewer-tracking system.

The optical system may comprise a collimating optical system. The optical system may comprise an array of converging lenses. The determining system may be arranged to control the relative positions of the optical system and an image displayed by the display device.

The display device may comprise a liquid crystal device.

The backlight may comprise a light emitting diode device or an organic light emitting diode device having groups of diodes disposed behind respective lenses.

The backlight may comprise an extensive light source and a reflector with apertures whose positions and/or sizes are controllable and which are disposed behind the optical system. The reflector may comprise at least one cholesteric liquid crystal cell. The reflector may comprise a controllable quarter wave plate and a reflective cholesteric polariser. The reflector may comprise a controllable half wave plate disposed between first and second reflective linear polarisers. The reflector may comprise an electrochromic mirror.

The backlight may comprise a plurality of independently controllable discrete light sources disposed behind the collimating optical system. The collimating optical system may comprise at least one Fresnel lens.

The backlight may comprise a light guide with controllable light-extraction features disposed behind the lenses.

The backlight may comprise an extensive light source, a reflector with fixed apertures, and an actuator for moving the reflector relative to the optical system.

The backlight may comprise an extensive light source and a lens array and the optical system may comprise a light steering arrangement. The steering arrangement may comprise an electrowetting lens arrangement. The steering arrangement may comprise an electrowetting prism arrangement.

According to a second aspect of the invention, there is provided a display method for using a display according to the first aspect of the invention to obtain reduced power consumption.

It is thus possible to provide a display of reduced power consumption as compared with known displays. Such a display may have reduced operating cost and reduced environmental impact. When used in battery-powered equipment, such a display permits increased autonomy and/or reduced battery capacity.

Such a display may save power by emitting the light only toward the users so that less or no waste light is generated by sending light in all directions. A gain of about 800 to 1000 is possible if the light is emitted in a solid angle having a half angle of about 2 degrees, compared to a display emitting in all directions with a lambertian luminance. A gain of about 30 to 40 is possible if the light is emitted in a solid angle having a half angle of about 10 degrees, compared to a display emitting in all direction with a lambertian luminance.

The direction of emission may be tuneable and may be modified as a function of the user position. The control of the direction may be done by the user by means of tuning buttons on the electronic device or via a remote control. It may also be automatically adjusted by tracking the user and directing the light in its direction. Some embodiments may take into account several users and direct the light to each of these users. It is possible to use technologies that are not used to direct light for privacy or 3D because they induce leakages and hence crosstalk in 3D or similar applications. For reducing power consumption, lower optical performance of some optical components may be acceptable and some methods which would not work at all if low crosstalk is necessary become feasible. Acceptable viewer position freedom may be provided by allowing the viewer to view the display throughout a wide range of viewing angles.

DESCRIPTION OF THE EMBODIMENTS

Figure 1:
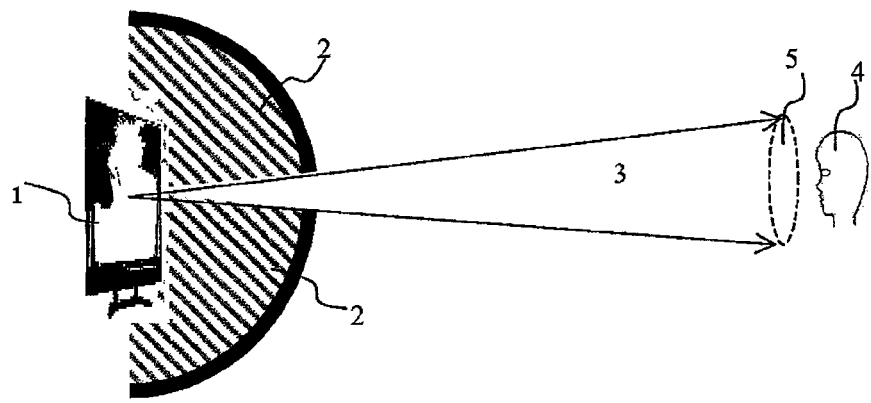
FIG. 1 shows a user watching the display with useful light reaching the eyes and wasted light emitted in other directions.

FIG. 1 demonstrates why current displays waste most of the energy supplied to them. It shows that most of the light emitted by a display 1 is wasted because it does not reach the user 4. This wasted light 2 contributes to a high power consumption. The useful light 3 emitted by an electronic display 1 is only useful when emitted toward the user 4.

Figure 2:
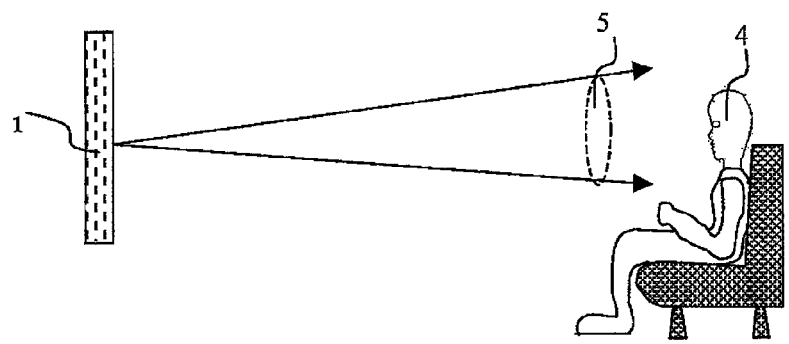
FIG. 2 shows a side view of the user watching the display at the same level as the axis of the display with a narrow beam of light, emitted from the display, reaching the eyes.

An electronic display 1 is provided that limits the waste of light. As shown in FIG. 2, the display emits light towards a narrow viewing zone 5. The position and size of this viewing zone are tuneable to adapt to the position of the user's face 4. While some light may be emitted in other directions, the total amount of light wasted is much smaller than in a display which emits light in all directions.

As the user is not always in front of the display, means are provided to save power while providing the same image quality to a user which is off axis 6. When the user is away from the central axis of the display, the viewing zone 7 is adapted to the position of the user 6. For example, the direction of light emission is tilted vertically if the user is above or below the axis of the display, as shown in FIG. 3.

Figure 4:
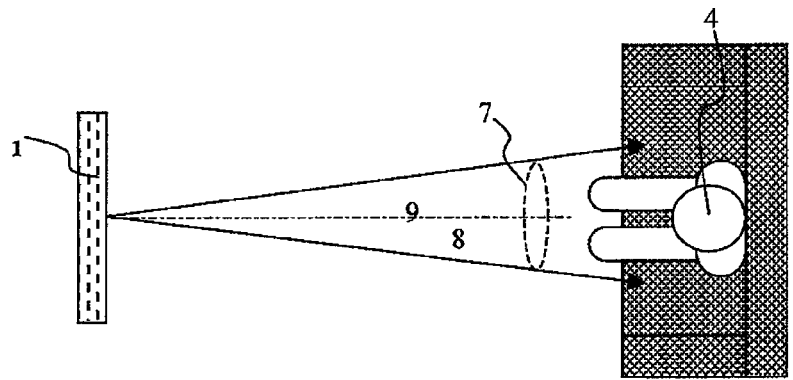
FIG. 4 shows a top view of the user watching a display on the axis of the display with a narrow beam of light, emitted from the display, reaching the eyes.
Figure 5:
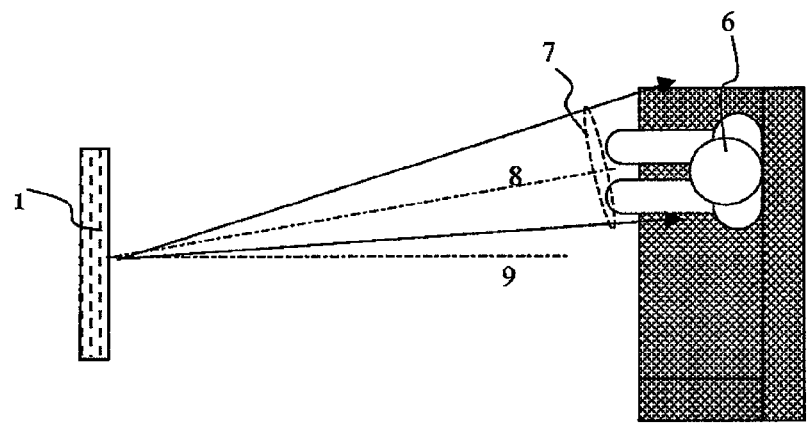
FIG. 5 shows a top view of the user watching a display with the user off the axis of the display and with a narrow beam of light, emitted from the display at an angle, reaching the eyes.

Another feature, as shown in FIG. 4 and FIG. 5, is to turn the direction 8 of emission horizontally when the user moves laterally off the axis 9 of the display.

Figure 6:
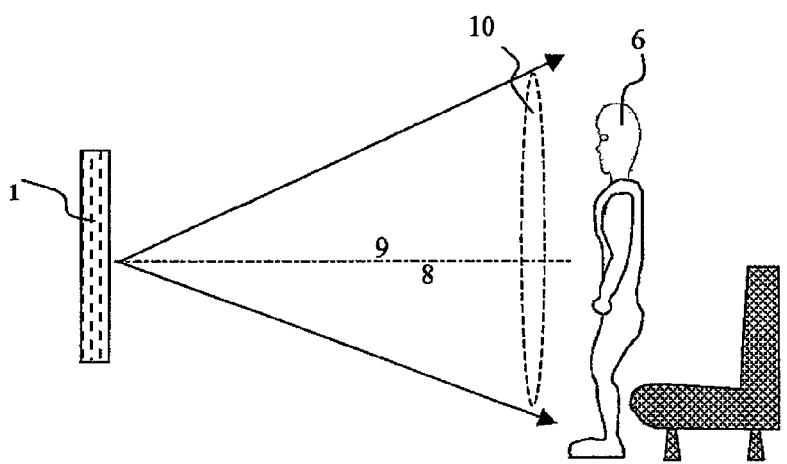
FIG. 6 shows a side view of the user watching the display with the user, standing, at a higher level than the axis of the display and with a wider beam of light, emitted from the display, reaching the eyes.
Figure 7:
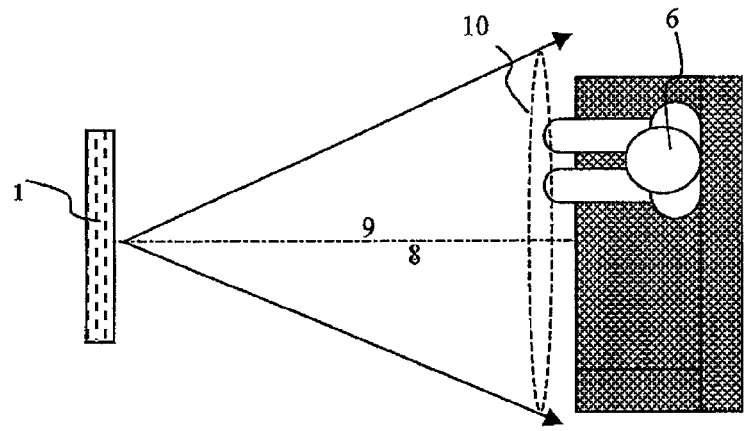
FIG. 7 shows a top view of the user watching a display with the user off the axis of the display and with a wider beam of light, emitted from the display, reaching the eyes.

A different method may be used to adapt to the user's head position. This alternative method is to increase the width of the viewing zone by increasing the range of angles toward which the light is emitted. Such a method may adapt to vertical change of user's position as shown in FIG. 6. The viewing zone is much wider than that in FIG. 2 where the user is on axis, and the power consumption will increase. However, the width of the viewing zone may be restricted so that it includes at least the user in the viewing zone but it does not become as wide as for a standard display as in FIG. 1. It may also adapt to horizontal movement of the user as shown in FIG. 7, and has to be compared with FIG. 4 where the user is on axis.

Figure 3:
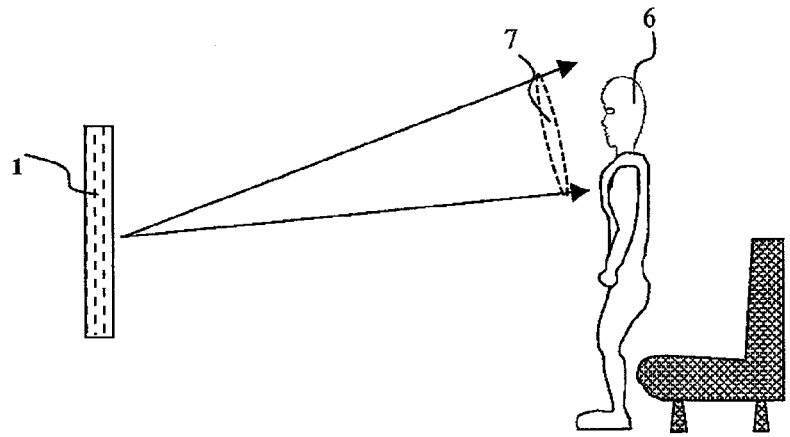
FIG. 3 shows a side view of the user watching the display with the user, standing, at a higher level than the axis of the display and with a narrow beam of light, emitted at an angle from the display, reaching the eyes.

This method of widening the viewing zone to adapt to the user position (FIG. 6 and FIG. 7) may also be combined with the first method which steers the light toward the user (FIG. 3 and FIG. 4). The combination may be simultaneous, i.e. the width of the viewing zone increases and the centre of the viewing zone is steered simultaneously. Alternatively, the combination of these two methods may be sequential, i.e. when the user moves, the width of the viewing zone is firstly increased, then the centre of the viewing zone is steered to be centred on an optimal position, then the width of the viewing zone is decreased to focus on the user and save more power. The optimal position is on the user if there is only one user, or a position between the users if there are several users.

Figure 8:
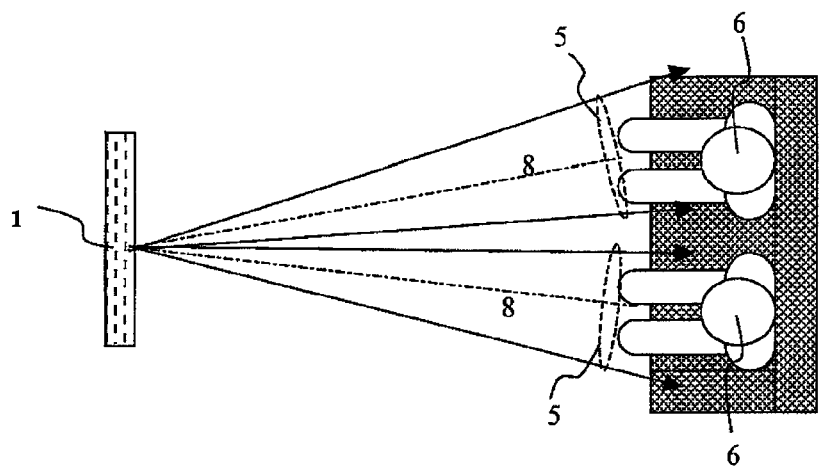
FIG. 8 shows a top view of two users watching a display with the users off the axis of the display and with two narrow beams of light, emitted from the display at angles, reaching each users' eyes.
Figure 9:
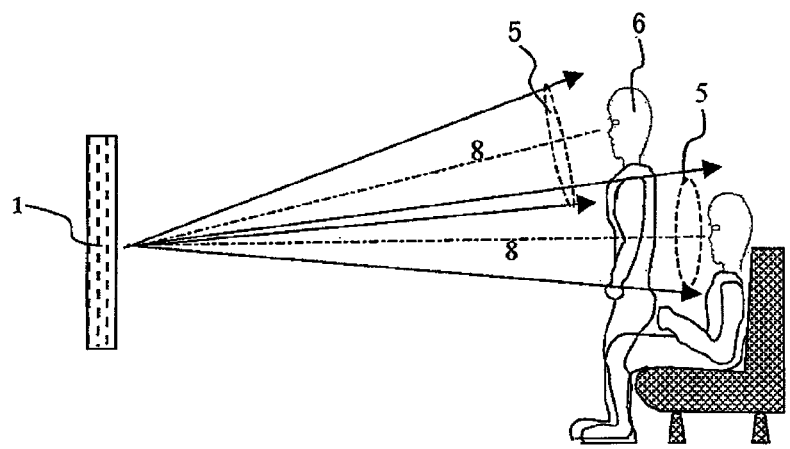
FIG. 9 shows a side view of two users watching a display with both users at different heights and with two narrow beams of light, emitted from the display at angles, reaching each user's eyes.

The display may be intended to be used by any number of users simultaneously. In order to provide visibility of the display 1 to several users and still save power, several viewing zones may be generated by emitting light in several discrete directions. Each viewing zone is targeted to its respective user as shown in FIG. 8 and FIG. 9, where there are two off axis users 6 that receive light from the display in their respective viewing zones 5.

Figure 10:
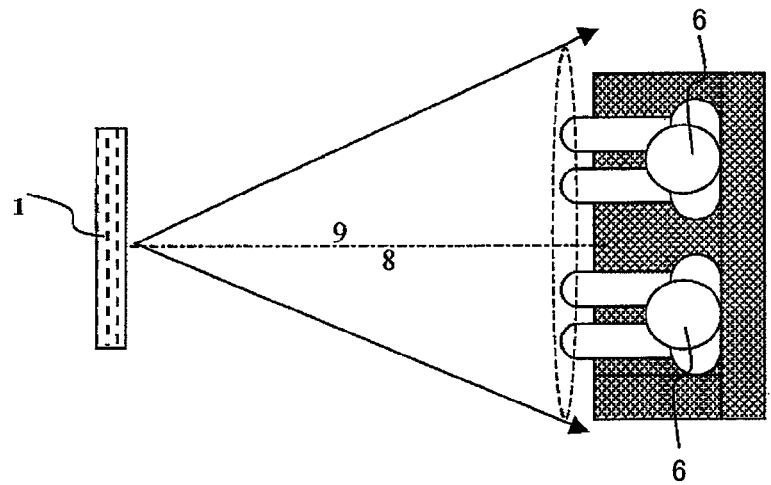
FIG. 10 shows a top view of two users watching a display with both users off the axis of the display and with a wider beam of light, emitted from the display, reaching both users' eyes.

The display may also use the method of widening the viewing zone to adapt to multi-users. The width of the viewing zone is increased so that it covers all the users as shown in FIG. 10. The control system would minimize the size of the viewing zone as much as possible to minimize the wasted light.

Information is required on the direction 8 where to send the light. This information is necessary to optimise the power saving and keep displaying the best image to the user.

Figure 11:
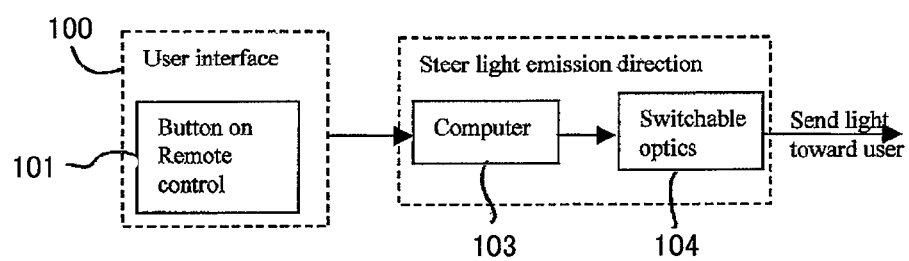
FIG. 11 is a diagram illustrating the process to control direction or width of the light beam as a function of a command from the user.
Figure 12:
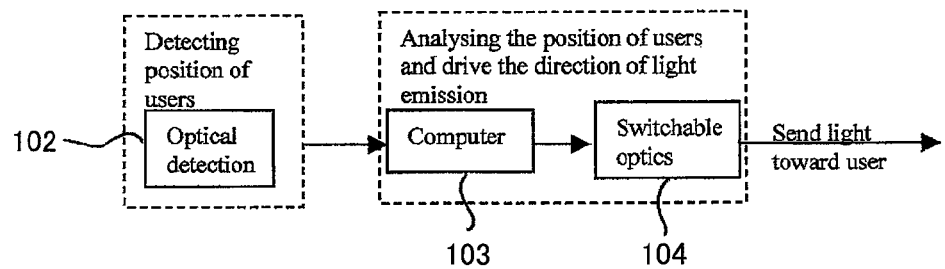
FIG. 12 is a diagram illustrating the process to automatically steer the direction of the light as a function of the user position.

The information on the optimised direction may be controlled by the user through a user interface 100. The user adapts the position and size of the viewing zone by means of a control button 101 on the display module or on a remote control as shown in FIG. 11. However, this setting is fixed and needs to be updated by the user which might be a constraint if the position or the number of users changes frequently. In order to increase the gain in power saving, the information on user's positions should preferably be automated. The information on the position of the users may be obtained automatically by tracking the users as in US2007/0188667. As shown in FIG. 12, an optical detector such as a camera 102 observes the area in front of the display. An image analysis is performed by a computer 103 to identify the positions of the users and feed the controller of a light steering system such as switchable optics 104 with information on the directions of light emissions.

The display may be made in different ways. Commonly, in the different embodiments, the system is able to control either the direction of emission of one or more narrow emission cones or to control the width of these emission cones or to control both width and direction.

Figure 13:
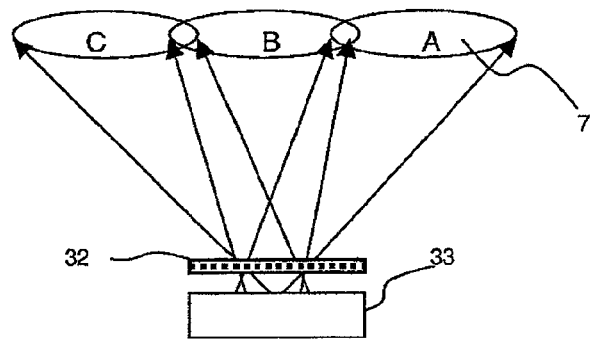
FIG. 13 shows a display composed of a transmissive display device and a directed backlight that provides several viewing windows.

In the embodiment shown in FIG. 13, a transmissive display or spatial modulator 32 is combined with a directed light source 33. The transmissive display 32 is, for example, a transmissive LCD panel. The directed backlight 33 is a large source that illuminates selectively toward one or several of the viewing zones 7. The transmissive display 32 modulates the image.

Figure 14:
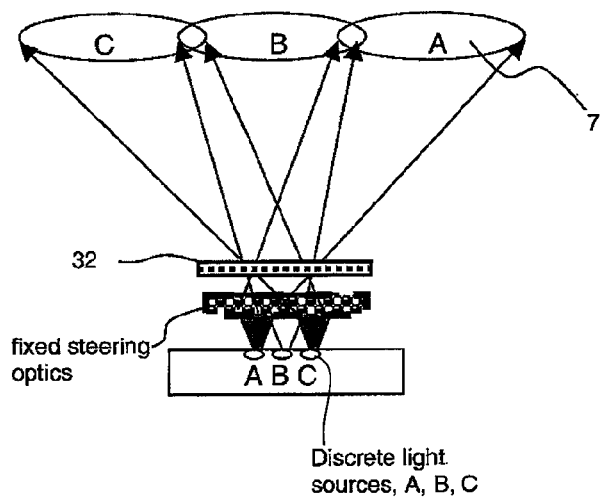
FIG. 14 shows a display similar to FIG. 13, wherein the directed backlight is composed of directional optics and selectable light sources.
Figure 15:
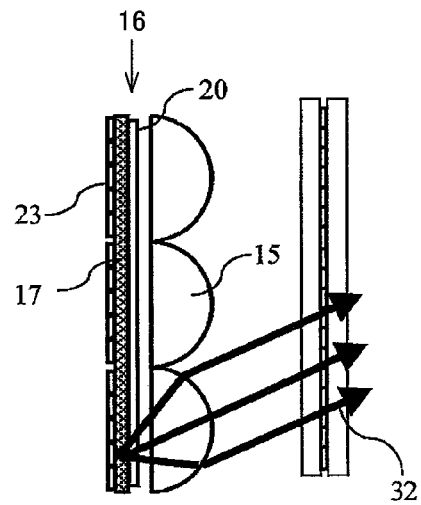
FIG. 15 shows a display similar to FIG. 14, wherein the directed backlight is composed of an array of lenses combined with an OLED display.

The directed backlight may be composed of an emissive display such as an OLED 16 combined with converging lenses 15. A monochrome OLED is used. This emissive display, used as a backlight, does not show an image. Instead, the position of the light emission is selectable in order to control the direction of the light emission when the light is redirected by the array of lenses. This directed backlight is placed behind a spatial light modulator such as the LCD 32 which provides the image information to the user, as shown in FIGS. 14 and 15. The addressing of the OLED is simplified because it does not need to provide an image. The electroluminescent material 17 is addressed between stripes of patterned electrodes 23 and a plain electrode 20, when combined with lenticular lenses parallel to the stripes. A passive matrix is used if the pixels are placed between an array of circular lenses.

Figure 16:
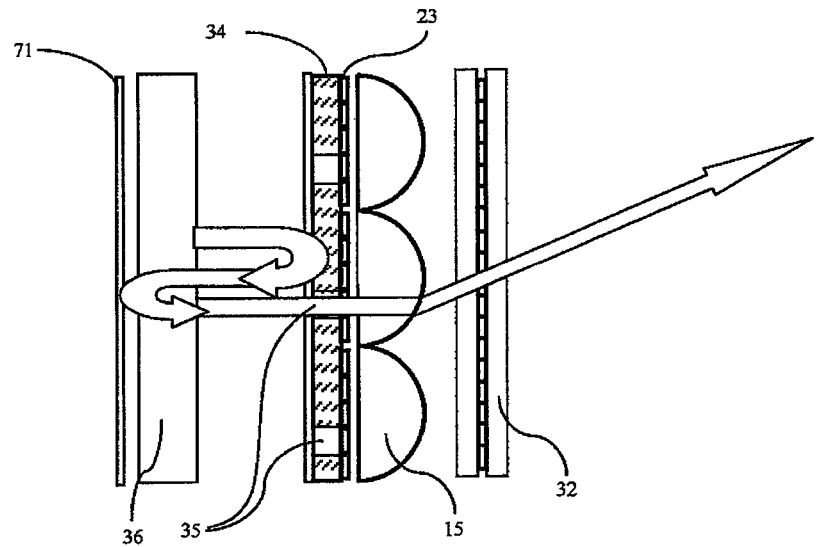
FIG. 16 shows a display similar to FIG. 13, wherein the directed backlight is composed of an array of lenses combined with an addressable switchable mirror.

In another embodiment, a patterned switchable mirror 34 associated with lenses is used to control the direction of the light emitted, as shown in FIG. 16. The electrodes of the switchable mirror are patterned 23 so the width and the position of transparent slits can be controlled electronically. The mirror 34 reflects the light that does not go through the slit. This light is reflected toward the backlight and is reflected again by a diffuser or the back-mirror 71 of the backlight unit 36. This light reflected several times is considered recycled because it has another chance to go through the slit and thus to go toward the user, so to be useful. The light going through the slit appears to come from a point source. The slit is placed at the focal plane of the lens 15 of the lens array. The rays exiting the lens are collimated parallel to the direction described by the line going from the slit to the centre of the lens. By increasing the width of the slit, the angle of emission is increased. By moving laterally the position of the slit, the emission cone may be steered laterally. A conventional backlight 36 is used behind this switchable LCD to provide the illumination. This backlight may be the edge-lit or direct lit type of backlight.

There are different ways to make a switchable mirror. A first method consists in using an addressable cell of liquid crystal in cholesteric mode 37. In the cholesteric mode, the liquid crystal layer reflects a circular polarisation of the light. The cell is made of two substrates 40 with transparent electrode 20 and patterned electrode 23. When a voltage is applied, the orientation of the liquid crystal molecule is changed and the layer becomes transparent.

Figure 17:
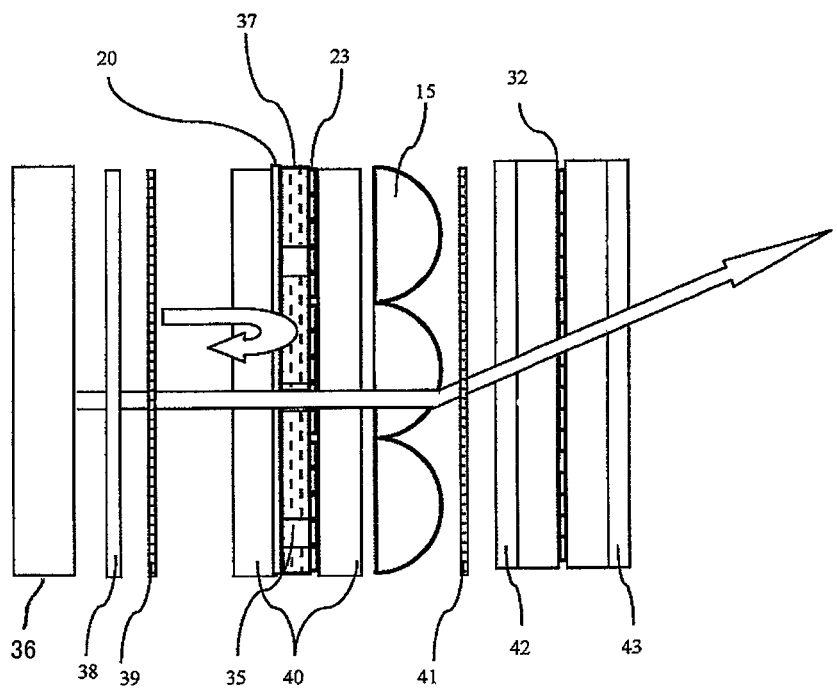
FIG. 17 shows a display similar to FIG. 16, wherein the switchable mirror is made from a switchable cholesteric liquid crystal cell combined with a dual brightness enhancing film (DBEF) and two quarter waveplates.

The optical principle of the system is shown in FIG. 17. The light coming from the backlight 36 is linearly polarised by the reflective polariser 38. One kind of reflective polariser is the DBEF film from 3M, but other linear reflective polarisers may also be used. The linear polarisation is transformed into circular polarisation through the quarter waveplate 39. In cholesteric mode, the liquid crystal 37 reflects the circularly polarised light. The cholesteric cell may be composed of one or multiple switchable cholesteric liquid crystal layers that reflect light over the full visible spectrum. An electric field can be applied between the transparent electrode 20 and patterned electrode 23. The patterning of the electrode 23 allows selection of which area 35 of the liquid crystal layer undergoes the electric field. The liquid crystal molecules under electric field align parallel to the electric field, breaking the reflective effect of the cholesteric mode. The area is transparent for the circularly polarised light which goes through, providing a slit in the reflective layer.

An array of lenses 15 is disposed after the cholesteric switchable liquid crystal layer. The lenses are disposed so that the focal plane is near the switchable reflective mirror, so the light beam is collimated. The position of the transparent area determines the angle of the light direction exiting the lens.

The circularly polarised light is then transformed into linearly polarised light through a second quarter wave plate 41, before reaching the back polariser 42 of the LCD panel and being modulated by the LCD and the front polariser 43.

The light reflected back by the cholesteric liquid crystal can follow various optical paths. After reflection on one of the numerous optical films of the backlight unit (DBEF, diffuser, BEFs, back-mirror 71) the light will meet the switchable mirror and be reflected unless it meets the transparent slit 35. This light is recycled because when reflected back in the backlight it has a chance to be emitted in the direction of the user instead of being emitted in a wrong direction.

Figure 18:
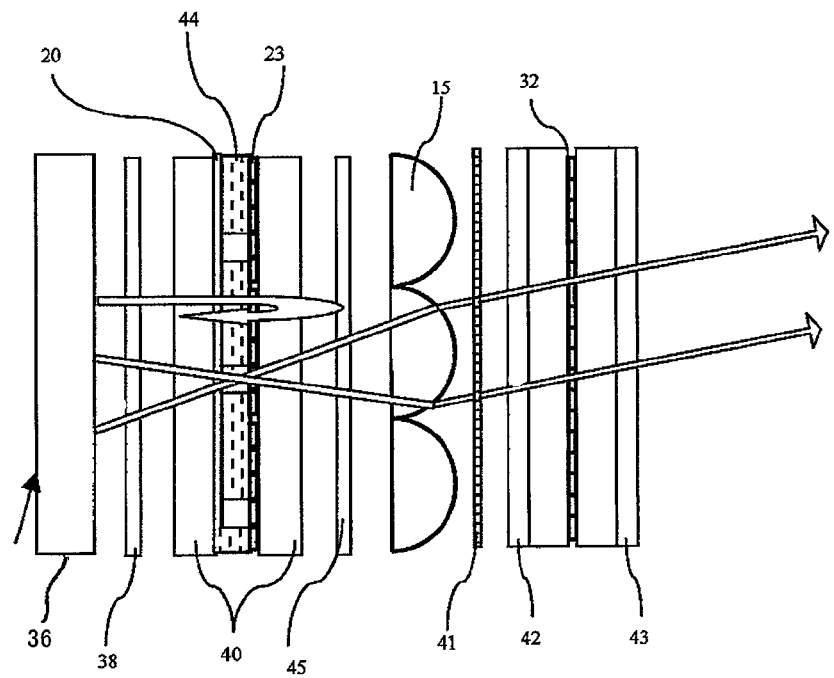
FIG. 18 shows a display similar to FIG. 16, wherein the switchable mirror is made from a switchable quarter waveplate liquid crystal cell combined with a DBEF and a fixed cholesteric layer.

Another system shown in FIG. 18 uses a switchable addressed quarter wave plate 44, a fixed reflective cholesteric polarizer 45 and an array of lenses 15. The fixed reflective cholesteric polarizer may be for example the Transmax made by Merck or the Circular Polariser commercialized by Chelix or the ones described in U.S. Pat. No. 6,061,108 and U.S. Pat. No. 6,339,464. A first reflective linear polarizer 38 such as a DBEF is used to provide a linear polarization of the light coming from the backlight 36. The linear polarized light goes through the switchable liquid crystal cell 44. The switchable liquid crystal cell may use in plane switching or out of plane switching to switch the polarization state of the light. It transforms linearly polarised light into either a right handed circular polarisation or a left handed circular polarisation. The switchable liquid crystal cell may be a quarter wave plate which undergoes an in plane switching of the optical axis so that it provides either left or right hand circular polarisation. It may also be the combination of a switchable half waveplate with a fixed quarter wave plate, both aligned in the same direction. This combination allows switching between a quarter wave plate and three-quarters of a wave plate, then switching between left-hand and right hand circular polarisation. Finally the switchable liquid crystal cell may be a switchable retardation cell that has a retardation of three-quarters of the wavelength at 0 v and a retardation of a quarter of the wavelength when a voltage is applied, providing a switch between the left-hand and right-hand circular polarisation modes. The switchable liquid crystal cell 44 is placed near the focal plane of the lenses 15. Patterned electrodes 23 allow addressing voltage in different areas of the cell. The light which is polarized circularly in the same orientation as the circular polariser is reflected by the circular polariser. By applying an electric field, the polarisation is controlled to be polarised in the opposite orientation of the circular polariser.

The light which is polarised circularly in the opposite orientation to the cholesteric polariser is transmitted. This light meets the lens where the focal plane is situated in the plane of the switchable quarter waveplate. The light is collimated by the lens. The direction of the collimated light depends on the position of the electric field that switches the liquid crystals. The width of the zone of the electric field determines the efficiency of the collimation, a large slit providing more of a cone of emission than a perfectly parallel beam. In order to enter in the back polariser 42 of the LCD 32, the circular polarisation is converted back to linear by a quarter waveplate 41.

Alternatively, the system may be made with the light reflected when an electric field is applied and transmitted in the absence of an electric field.

Figure 19:
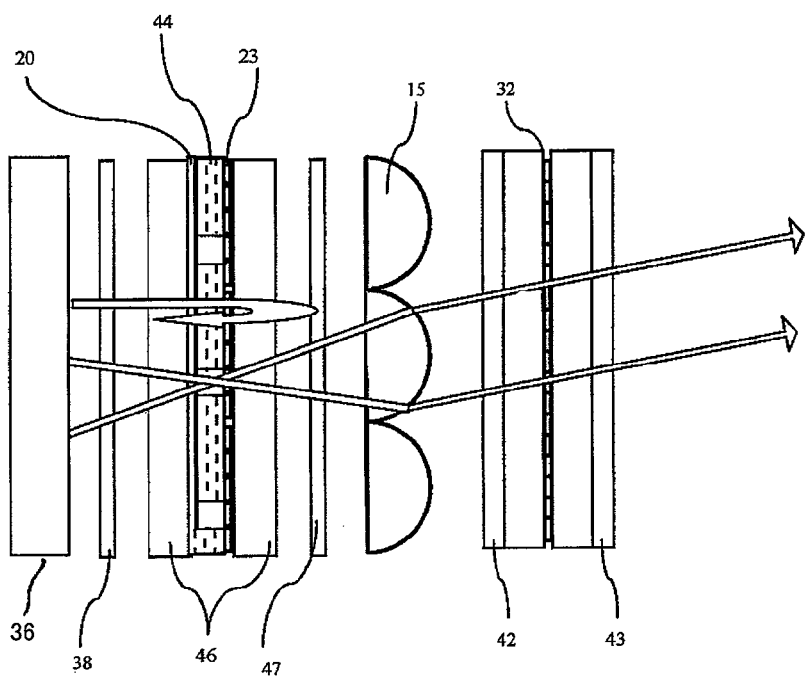
FIG. 19 shows a display similar to FIG. 16, wherein the switchable mirror is made from a switchable half waveplate liquid crystal cell combined with two DBEFs.

A switchable mirror may also be provided using a switchable half wave plate. 46 placed between two linear reflective polarizers 38 and 47 such as DBEF films, as shown in FIG. 19. The light from the backlight 36 is firstly linearly polarized by a first linear reflective polarizing film 38. This linear polarization is rotated by the switchable half wave plate 46 in Off state (or in On state). The rotated polarization is reflected by the second DBEF 47 to be recycled in the backlight 36. Light going through the on state part (respectively the Off state part) of the switchable layer is not rotated and then goes through the second DBEF to the lenses 15. The switchable half waveplate 46 is placed near the focal plane of the lenses. It is made from liquid crystal between transparent electrodes, and may use any one of different liquid crystal modes such as electrically controlled birefringence (ECB), twisted nematic (TN), super-twisted nematic (STN), vertically aligned nematic (VAN), etc. Lenses, as in the previous examples, collimate and direct the light toward one direction.

Figure 20:
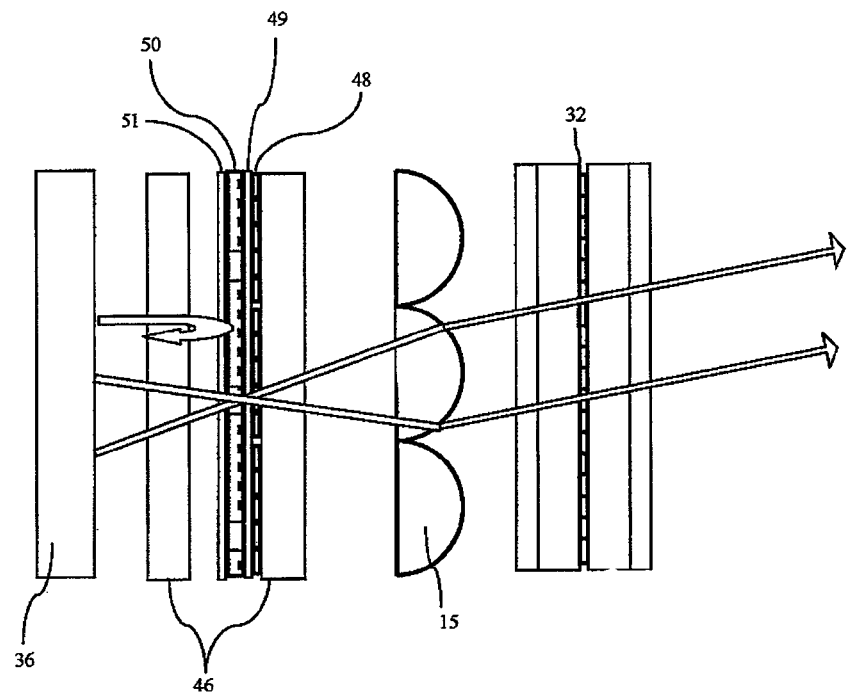
FIG. 20 shows a display similar to FIG. 16, wherein the switchable mirror is made from an electrochromic switchable mirror.

In another embodiment, for which FIG. 20 shows an example, the switchable electrochromic mirror is made using a transition metal switchable mirror as described in the U.S. Pat. No. 6,647,166. The switchable mirror may be composed of a first patterned transparent electrode 48 made from indium-tin-oxide, then an electrolyte 49 containing magnesium, a mirror electrode 50 also containing magnesium and another transparent electrode 51 made from indium-tin-oxide, all coated on the internal side of the glass substrate 46 of a cell filled with hydrogen gas and minor quantities of other gases. The patterned transparent electrode 48 allows selection of parts of the electrochromic mirror that transmit light and parts that reflect light.

This electrochromic switchable mirror is placed at the focal plane of the array of lenses 15 and is switched to a transmissive mode in areas where the lens will redirect the light toward the user. Conversely, it is switched to a reflective mode in areas where the lens will redirect the light toward nobody. This reflected light is recycled within the backlight 36 by reflection or scattering.

Figure 21:
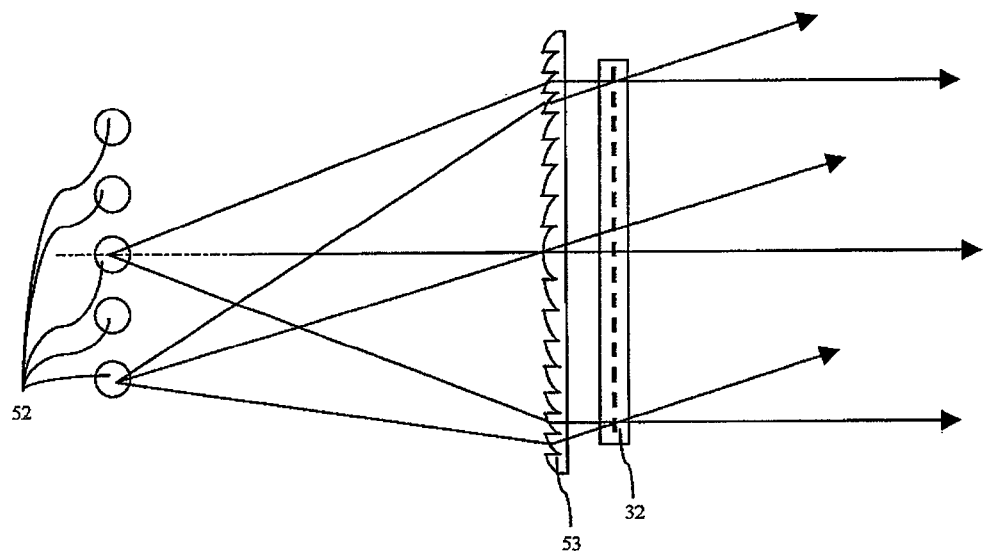
FIG. 21 shows a display similar to FIG. 14 wherein there is a lens the size of the display and several light sources.

In another embodiment, of which an example is shown in FIG. 21, several light sources 52, such as discharge lamps, are placed at the focal plane of a large lens 53. This large lens may be a Fresnel lens or a holographic lens. The lens is as large as or bigger than the liquid crystal panel 32 in front of which it is placed. Each light source is positioned in the focal plane of the lens so that, when it shines, the light is collimated and directed toward a related viewing zone. Light sources whose light is directed toward a viewing area where there is no viewer are turned off to reduce power consumption.

Figure 22:
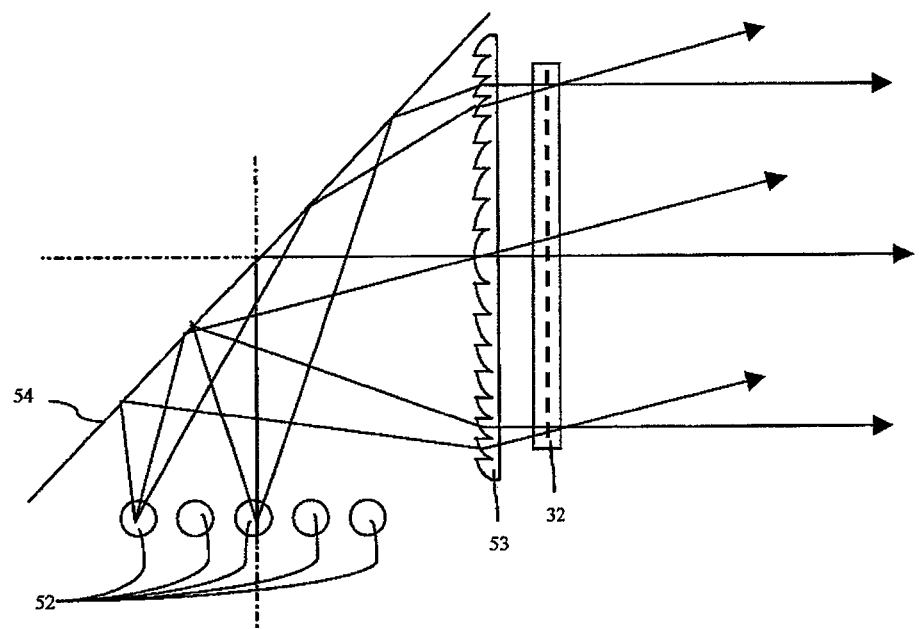
FIG. 22 shows a display similar to FIG. 21, wherein a mirror is used to reduce the depth of the illumination system.

The embodiment of FIG. 21 may also use one or more mirror 54 to reflect the optical beam in order to reduce the depth of the display as shown in FIG. 22.

Figure 23:
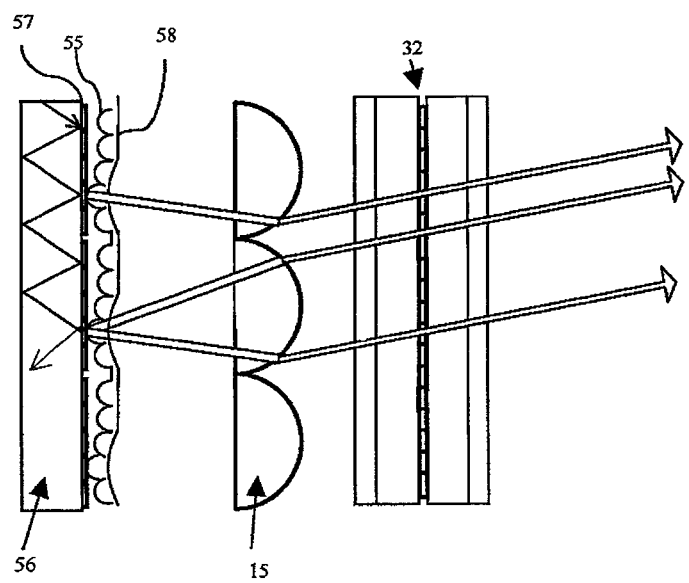
FIG. 23 shows a display similar to FIG. 14 wherein the selectable light sources are made from a lightguide with switchable extraction features.

Another directional backlight combines an array of lenses 15 combined with a switchable extraction feature element 55 of a lightguide 56 as shown in FIG. 23. The switchable extraction feature element 55 is an element that mechanically comes in contact with the lightguide and breaks the condition of total internal reflection. The extraction feature element may be activated by applying an electric field as in the system described by Takeuchi in U.S. Pat. No. 6,724,973, or by Selbrede in U.S. Pat. No. 5,319,491. The electric field between the patterned transparent electrode 57 on the lightguide and the flexible transparent electrode 58 creates a force that attracts the extraction feature toward the lightguide. The light escapes from the lightguide where an extraction feature is in contact with the lightguide. It is possible to select the position where the light is extracted because the extraction features are independently switchable. The position of the light extraction is the condition for the direction of illumination of the display because the extraction features are in the focal plane of the directional array of lenses 15.

By combining a liquid crystal display panel 32 with this directional backlight unit, we obtain a directional display with low power properties.

Figure 24:
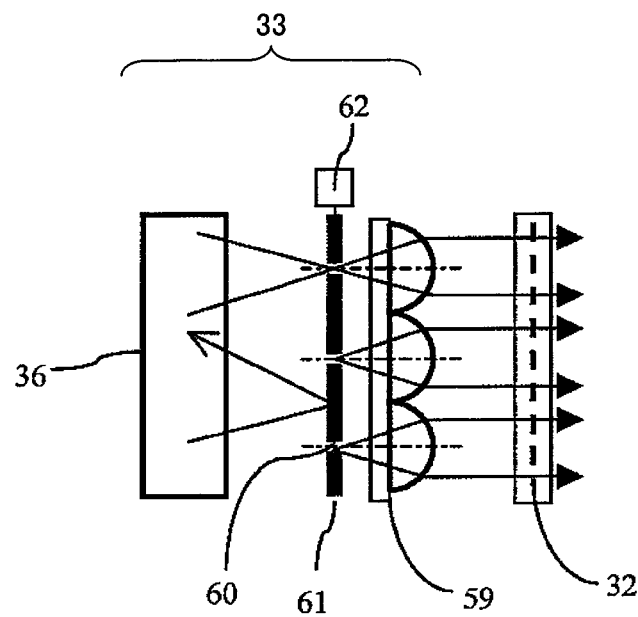
FIG. 24 shows a display similar to FIG. 13, wherein the directed backlight is composed of an array of lenses combined with an array of slits patterned in a mirror which can move, and a backlight to provide illumination.

Another type of embodiment uses a transmissive display 32 combined with a directed backlight unit 33 which is made from small apertures and an array of lenses 59. As an example, FIG. 24 shows a backlight where small apertures 60 are made in a mirror 61. The light is either reflected back into the backlight or transmitted through a slit 60 of the mirror 61. The light from the slit appears to come from a point source. As it is placed at the focal plane of the array of lenses 59, this light is collimated. The position of the lens array relative to the slits determines the direction of emission of this backlight system and also the degree of collimation. A shift of the slit away from the axis of the lens steers the light in one direction. When the distance between the focal plane and the plane of the lens changes, it sets the degree of collimation of the light beam. In order to control the position of the lens array relative to the slits, two solutions are offered, shifting the lenses or shifting the slits.

In FIG. 24, the patterned mirror is connected to an electromechanical actuator 62. A tracking system supplies control signals to the actuator so as to position the mirror with respect to the lens array so that the light is directed toward the user.

Figure 25:
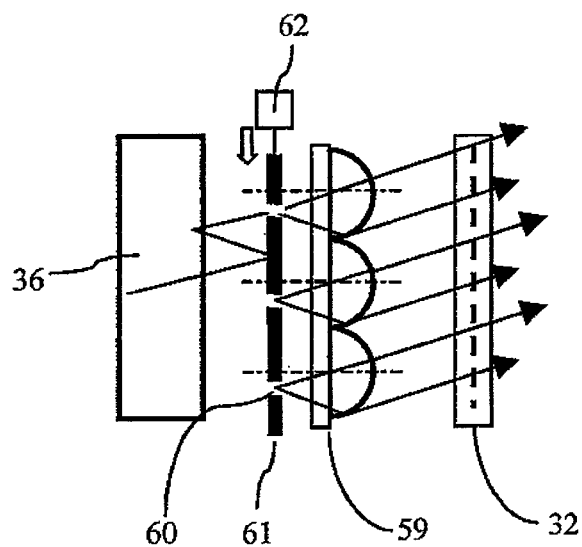
FIG. 25 shows the display of FIG. 24, wherein a mechanical actuator moves the apertures of the patterned mirror off the axis of the lenses in order to steer the viewing window.

The mechanical actuator 62 may for example be a stepper motor that provides a lateral translation movement to the mirror. Because the slits in the mirror have moved laterally, the light direction after the lenses is tilted, as shown in FIG. 25. The viewing zone is shifted laterally by control of the actuator.

Figure 26:
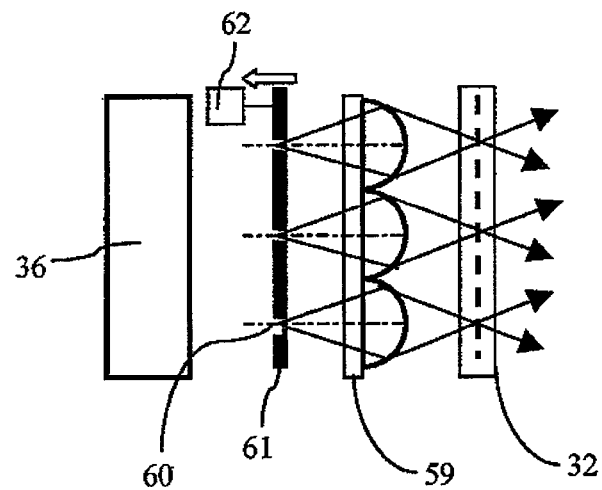
FIG. 26 shows the display of FIG. 24, wherein a mechanical actuator moves the apertures of the patterned mirror away from the focal plane of the lenses in order to widen the viewing window.

Alternatively, the mechanical actuator may be connected to the mirror so that the distance from the mirror to the lenses is modified. Then as the slits come out of the focal plane, there is no longer collimation of the light beam and the viewing zone is widened as shown in FIG. 26.

Figure 27:
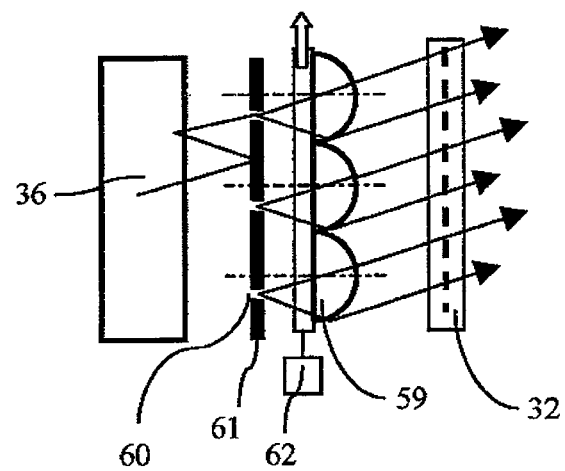
FIG. 27 shows the display of FIG. 24, wherein the mechanical actuator displaces the array of lenses instead of the patterned mirror.

Alternatively, instead of moving the mirror slits 60, a mechanical actuator is used to displace the array of lenses 59 as shown in FIG. 27.

Figure 28:
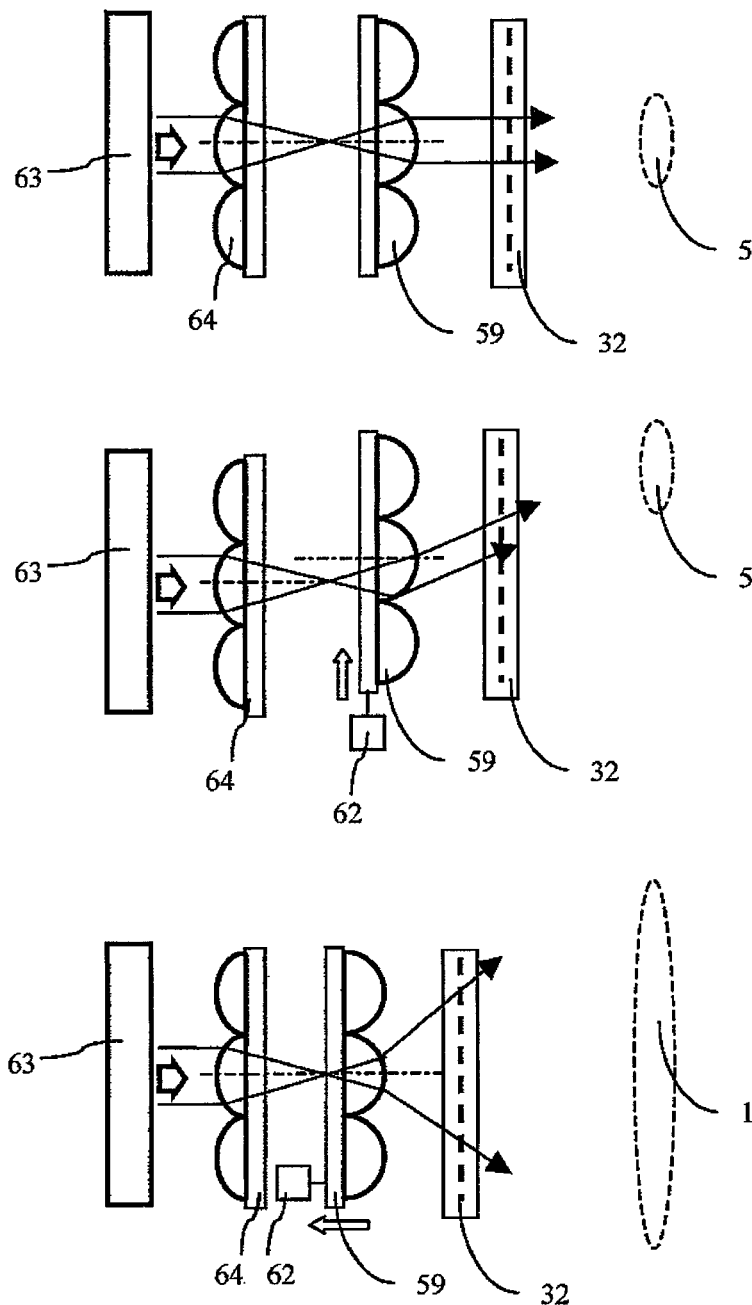
FIG. 28 shows a display similar to FIG. 24, wherein the patterned mirror is replaced by a first array of lenses and the backlight is a collimated backlight.

In another embodiment, as shown in FIG. 28, a collimated backlight 63 is combined with a first array of lenses 64. The collimated backlight provides light collimated parallel to the axis of the display. The first array of lenses 64 focuses the light in the focal plane of the second array of lenses 59. A mechanical actuator 62 displaces the second array of lenses 59 in order to control the direction of the light emission. A lateral displacement of the lenses 59 causes a lateral shift of the narrow viewing zone 5. A displacement of the lenses 59 in the out of plane direction causes a change in the width of the viewing zone 10.

Figure 29:
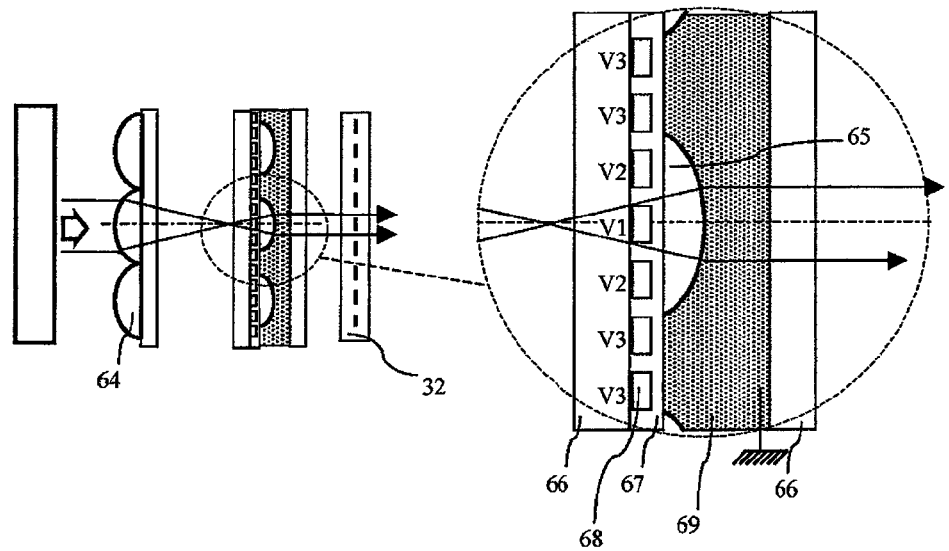
FIG. 29 shows a display similar to FIG. 28, which is composed of a collimated backlight, a first array of lenses and a switchable array of electrowetting lenses.
Figure 30:
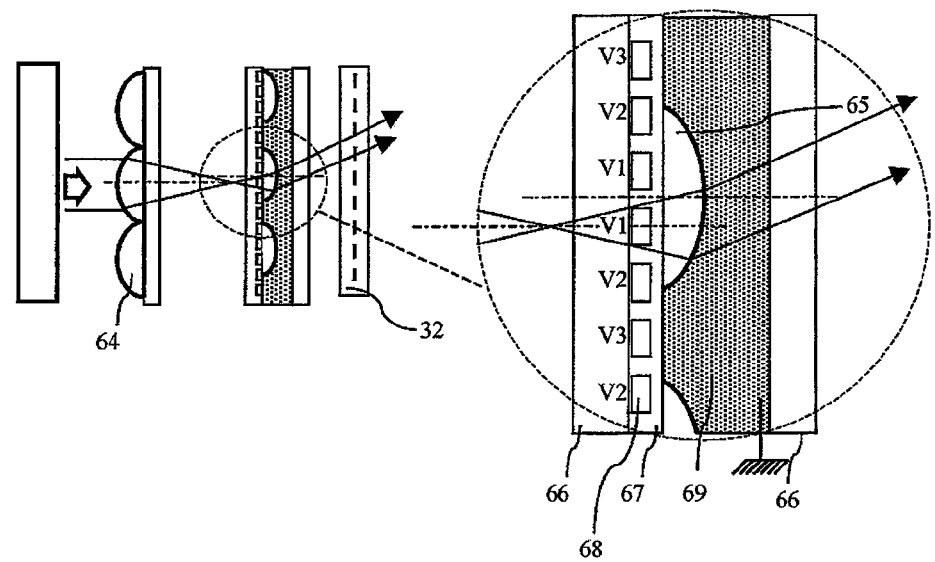
FIG. 30 shows the display of FIG. 29, wherein the electrowetting lenses are displaced laterally to steer the light.

Another embodiment uses an array of lenses where the lenses are electrically controlled in curvature or position to provide a light steering arrangement. The liquid-liquid interface of two iso-density non-miscible liquids trapped in a transparent cell forms a drop shape. This drop shape is used as an electrically switchable lens, known as the process of electrowetting. As described in the European patent EP1019758, a radial gradient of an electric field may be used to control the position centring of the drop. In the embodiment shown in FIG. 29 and FIG. 30, an array of drops of an insulating liquid 65 is made on a substrate 66 of a cell. The cell is filled with a conductor liquid 69 of different refractive index. The surface of one substrate 66 of the cell is coated with an insulating layer 67 over transparent patterned electrodes 68. The electrodes provide different voltages in order to provide gradients of electric fields to centre each of the drops 65 in a controlled position. The voltage V3 is higher than the voltage V2 which is higher than the voltage V1 in order to create a radially decreasing electric field toward the centre of the drop. The centre of the electric field gradient may be translated by changing the voltage applied to each electrode 68. As shown in FIG. 30 the voltage applied to the electrodes has changed and the drops followed the position of the centre of the electric field gradient, where V1 is applied.

This array of electrowetting lenses may be used to steer the light by moving the lens sideways. It may also be used to switch between a collimated mode and a wide viewing angle by modifying the drop shape as a function of the voltage applied by the electrodes.

Figure 31:
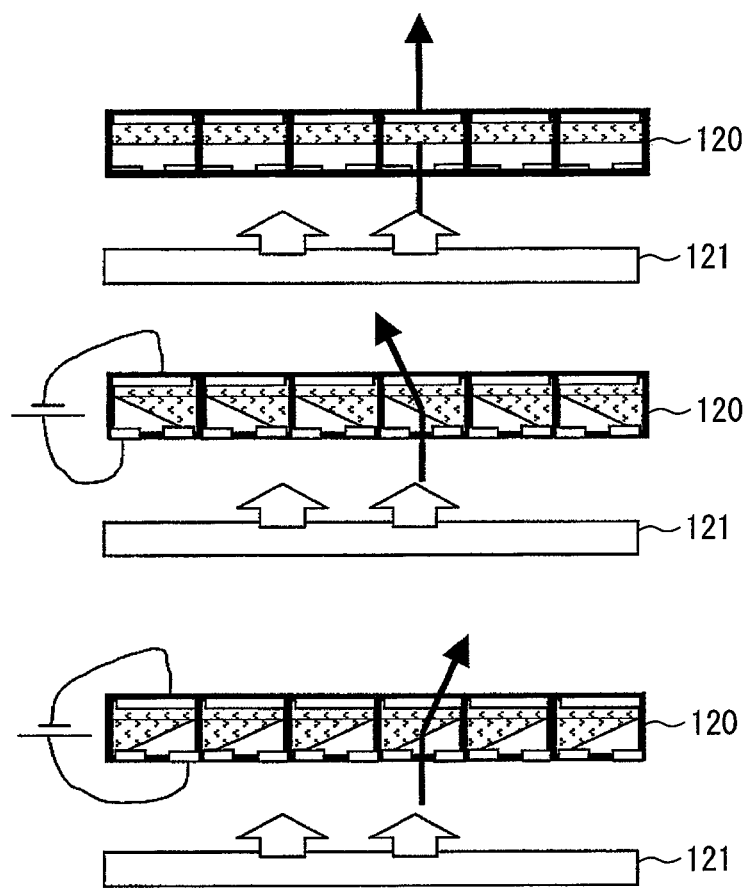
FIG. 31 is a cross-sectional view of a directed backlight comprising a collimated backlight combined with an array of electrowetting prisms in cells which steer the light beam.

Another embodiment shown in FIG. 31 uses electrowetting technology to provide a light steering arrangement to steer the light. A switchable micro-prism array is made where the inclination of the prism can be switched as an electric field is applied. The inclination of the interface between the two liquids of different refractive index determines in which direction the light path is refracted. Such electrowetting prism array is described by Neil R. Smith (N. R. Smith et Al., 10 Jul. 2006/Vol. 14, No. 14 p 6557/OPTICS EXPRESS).

This electrowetting microprism array 120 is combined with a collimated backlight 121. The collimated beam is deviated by the prism. Controlling the angle of the prisms allows controlling the direction of the illumination. This system is placed behind a transmissive display such as an LCD panel.

What is claimed is:

1. A single view display comprising: a display device for displaying a single view;
   an optical system comprising a backlight for illuminating said display device and converging lenses for concentrating light from the backlight and modulated by said single view into a reduced angular range;
   an optical detector for determining a direction of a viewer relative to said display;
   a switchable electro-optic device for directing light from the optical system into the reduced angular range; and
   a control device for controlling the switchable electro-optic device so that said reduced angular range includes said determined direction.

2. A display as claimed in claim 1, in which said control device is arranged to control said switchable electro-optic device so as to vary an angle subtended by said reduced angular range in order to include said determined direction, said reduced angular range preferably being substantially symmetrical about a display axis.

3. A display as claimed in claim 2, in which said subtended angle is variable in a first plane containing said display axis, said subtended angle preferably being variable in a second plane containing said display axis and perpendicular to said first plane.

4. A display as claim 1, in which said control device is arranged to control said switchable electro-optic device so as to vary a direction of said angular range in order to include said determined direction.

5. A display as claimed in claim 4, in which said direction of said angular range is variable in a third plane containing said display axis, said direction of said angular range preferably being variable in a fourth plane containing said display axis and perpendicular to said third plane.

6. A display as claimed in claim 1, in which said optical detector is arranged to determine directions of a plurality of viewers relative to said display.

7. A display as claimed in claim 6, in which said control device is arranged to control said switchable electro-optic device so as to vary an angle subtended by said reduced range in order to include all of said determined directions.

8. A display as claimed in claim 6 in which said control device is arranged to control said switchable electro-optic device to produce a plurality reduced of angular ranges whose directions include all of said determined directions.

9. A display as claimed in claim 1, in which said control device includes a manually operable control to allow said viewer to select said determined direction.

10. A display as claimed in claim 1, in which said optical detector comprises an automatic viewer-tracking system.

11. A display as claimed in claim 1, in which said optical system comprises a collimating optical system.

12. A display as claimed in claim 11, in which said control device is arranged to control said relative positions of said optical system and an image displayed by said display device.

13. A display as claimed in claim 11, in which said backlight comprises a plurality of independently controllable discrete light sources disposed behind said collimating optical system, said collimating optical system preferably comprising at least one Fresnel lens.

14. A display as claimed in claim 1, in which said optical system comprises an array of converging lenses.

15. A display device as claimed in claim 14, in which said backlight comprises a light emitting diode device or an organic light emitting diode device having groups of diodes disposed behind respective ones of said converging lenses.

16. A display as claimed in claim 14, in which said backlight comprises a light guide with controllable light-extraction features disposed behind said converging lenses.

17. A display as claimed in claim 1, in which said display device comprises a liquid crystal device.

18. A display device as claimed in claim 1, in which said backlight comprises an extensive light source and a reflector defining apertures, at least one of whose positions and sizes are controllable, said apertures being disposed behind said optical system.

19. A display as claimed claim 18, in which the reflector comprises one of: at least one cholesteric liquid crystal cell; a controllable quarter wave plate and a reflective cholesteric polariser; a controllable half wave plate disposed between first and second reflective linear polarisers; and an electrochromic mirror.

20. A display as claimed in claim 1, in which said backlight comprises an extensive light source, a reflector defining fixed apertures, and an actuator for moving said reflector relative to said optical system.

21. A display as claimed in claim 1 said backlight comprises an extensive light source and a lens array and said optical system comprises a light steering arrangement, said steering arrangement preferably comprising one of an electrowetting lens arrangement and an electrowetting prism arrangement.

22. A display method for using a display to obtain reduced power consumption, said method comprising the steps of:
- displaying in a display a single view;
- concentrating light in an optical system which is modulated by said single view into a reduced angular range, said optical system including a backlight for illuminating said display device and converging lenses;
- determining with an optical detector a direction of a viewer relative to said display;
- directing light from the optical system into the reduced angular range with a switchable electro-optic device; and
- controlling said switchable electro-optic device so that said reduced angular range includes said determined direction, wherein
- the reduced angular range has reduced power consumption.

\* \* \* \* \*